(12) United States Patent
Smith et al.

(10) Patent No.: US 7,347,448 B2
(45) Date of Patent: Mar. 25, 2008

(54) INFLATOR DEVICE FOR AIRBAG INSTALLATIONS

(75) Inventors: Bradley W. Smith, Ogden, UT (US); Michael P. Jordan, South Weber, UT (US); D. Lynn Dinsdale, Farr West, UT (US); Guy R. Letendre, Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 179 days.

(21) Appl. No.: 10/968,628

(22) Filed: Oct. 19, 2004

(65) Prior Publication Data

US 2006/0082113 A1 Apr. 20, 2006

(51) Int. Cl.
*B60R 21/26* (2006.01)

(52) U.S. Cl. ............................. 280/736; 280/741

(58) Field of Classification Search ............. 280/736, 280/737, 740, 741; 102/530, 531, 202.14
See application file for complete search history.

(56) References Cited

U.S. PATENT DOCUMENTS

| | | | |
|---|---|---|---|
| 4,530,557 A * | 7/1985 | Katsube et al. | ............. 439/325 |
| 5,406,889 A | 4/1995 | Letendre et al. | |
| 5,482,316 A | 1/1996 | Lang et al. | |
| 5,551,343 A | 9/1996 | Hock et al. | |
| 5,564,741 A | 10/1996 | Ward et al. | |
| 5,649,720 A | 7/1997 | Rink et al. | |
| 5,746,793 A | 5/1998 | Rink et al. | |
| 5,779,268 A * | 7/1998 | Smith et al. | ............. 280/741 |
| 5,851,027 A * | 12/1998 | DiGiacomo et al. | ........ 280/736 |
| 6,044,557 A * | 4/2000 | Smith et al. | ............ 29/897.2 |
| 6,189,927 B1 | 2/2001 | Mossi et al. | |
| 6,598,901 B2 | 7/2003 | Nakashima et al. | |
| 6,726,243 B2 | 4/2004 | Dinsdale et al. | |
| 6,746,046 B2 | 6/2004 | Rink et al. | |
| 6,763,764 B2 * | 7/2004 | Avetisian et al. | ...... 102/202.14 |
| 2001/0001523 A1 * | 5/2001 | Green et al. | ............. 280/736 |
| 2002/0056976 A1 * | 5/2002 | Nakashima et al. | ........ 280/741 |
| 2002/0101068 A1 | 8/2002 | Quioc | |

FOREIGN PATENT DOCUMENTS

| | | |
|---|---|---|
| WO | 01/12476 A1 | 2/2001 |
| WO | 02/058971 A1 | 8/2002 |

* cited by examiner

*Primary Examiner*—Ruth Ilan
*Assistant Examiner*—Tiffany L. Webb
(74) *Attorney, Agent, or Firm*—Sally J Brown; Pauley Petersen & Erickson

(57) ABSTRACT

An inflator assembly having an inflator base including a simple stamping. The inflator base includes an end wall, first and second openings in the end wall, a base side wall generally perpendicularly extending from the end wall, and an attachment collar generally perpendicularly extending from the base side wall at a side opposite the end wall. A first initiator assembly is disposed through the end wall first opening. The first initiator assembly includes a first stamped adapter that is resistance welded joined to the inflator base. A second initiator assembly is disposed through the inflator base second opening. The second initiator assembly includes a second stamped adapter that is resistance welded joined to the inflator base.

24 Claims, 4 Drawing Sheets

INFLATOR DEVICE FOR AIRBAG INSTALLATIONS

BACKGROUND OF THE INVENTION

This invention relates generally to inflators for use in inflating inflatable restraint airbag cushions, such as used to provide impact protection to occupants of motor vehicles. More particularly, the invention relates to adapters for joining pyrotechnic initiator devices to or in inflator assemblies.

It is well known to protect a vehicle occupant using a cushion or bag, e.g., an "airbag cushion," that is inflated or expanded with gas such as when the vehicle encounters a sudden deceleration, such as in the event of a collision. In such systems, the airbag cushion is normally housed in an uninflated and folded condition to minimize space requirements. Upon actuation of the system, the cushion begins to be inflated in a matter of no more than a few milliseconds with gas produced or supplied by a device commonly referred to as an "inflator."

Various types of inflator devices have been disclosed in the art for the inflation of an airbag such as used in inflatable restraint systems. One type of known inflator device derives inflation gas from a combustible pyrotechnic gas generating material which, upon ignition, generates a quantity of gas sufficient to inflate the airbag.

In view of possibly varying operating conditions and, in turn, possibly varying desired performance characteristics, there is a need and a desire to provide what has been termed an "adaptive" inflator device and a corresponding inflatable restraint system. With an adaptive inflator device, output parameters such as one or more of the quantity, supply, and rate of supply of inflation gas, for example, can be selectively and appropriately varied dependent on selected operating conditions such as ambient temperature, occupant presence, seat belt usage and rate of deceleration of the motor vehicle, for example.

Such adaptive systems typically require the inclusion of additional components as a part of the associated inflator device. For example, various proposed or currently available dual stage inflator devices incorporate two individual initiators for activating gas generation from more than one generally isolated supply of gas generate material. As will be appreciated by one skilled in the art, the incorporation of two initiators can present difficulties in engineering and design.

More specifically, and for example, driver side airbag inflator devices commonly have the general form of a flattened, disk-shaped circular cylinder typically or generally having a length (sometimes referred to as "height") to diameter ratio of about 0.5 or less. For example, a typical driver side inflator might be about 40 mm in length or height and about 80 mm in diameter. An inflator device having such shape and size provides a familiar and convenient package for insertion in a corresponding or associated airbag module housing. Such disk-shaped inflator devices are often formed of two structural components, i.e., a lower shell or base and an upper shell or cap, that may be desirable and appropriately joined together.

FIGS. 1 and 2 illustrate two configurations of stamped lower shell components that are known and available in the art for inflator devices. The lower shell components shown in FIGS. 1 and 2 each include openings in a base portion adapted to receive initiators therethrough. The lower shell component 10 of FIG. 1 has a double hub stamping configuration including a first hub 12 with an opening 14 for receiving a first initiator (not shown) and a second hub 16 with an opening 18 for receiving a second initiator (not shown). The lower shell component 20 of FIG. 2 has a single hub stamping configuration, wherein a single hub 22 has two openings 24 for receiving both initiators (not shown). The stamped hubs are typically desired, at least in part, to create a "socket" for containing or surrounding the initiator pins into which an electrical connector, connected at the other end to sensors such as, for example, for detecting a collision or rollover, is inserted and secured.

Forming inflator device components, more particularly lower shell components, with relatively complex stamped configurations, such as shown, for example, in FIGS. 1 and 2, generally requires additional, and thus generally more costly, engineering and/or design considerations. A more complex stamping may result in a thinning of the stamped wall, and thus a potential weakening, in portions of the stamped components, such that the stamped inflator base will not satisfy hydroburst requirements. Hydroburst generally refers to a structural integrity test whereby a sealed inflator device housing is internally pressurized, such as, for example, to a pressure typically greater than about 7,000 pounds per square inch, to determine if the inflator device housing will leak or otherwise rupture. Generally, a more complex stamping will result in an undesirable increase in bowing or bending in areas of the lower shell, which can undesirably result in leaks or rupturing of the inflator device housing. To provide an inflator device that can meet hydroburst requirements, increased focus and cost has been directed to the materials used in forming the stamped component as well as the size, configuration and wall thickness of the stamped components.

There is a need for a simplified inflator device stamped lower shell configuration. There is a need for a lower shell configuration providing desired strength with a generally less complex, and thus generally less expensive to form, stamped configuration or "stamping."

SUMMARY OF THE INVENTION

A general object of the invention is to provide an improved inflator device.

A more specific objective of the invention is to overcome one or more of the problems described above.

The general object of the invention can be attained, at least in part, through an improvement to an inflator assembly including an inflator base with at least one opening passing therethrough and wherethrough an initiator assembly is disposed. In the invention, the inflator base includes a simple stamping. The initiator assembly comprises a stamped adapter. The stamped adapter is resistance welded joined with the inflator base simple stamping.

In contrast to an inflator assembly in accordance with the invention, the prior art generally fails to disclose a simple, strong and efficiently produced stamped inflator base configuration. The prior art also generally fails to disclose a simple, strong and efficiently produced welded connection between an inflator base and an initiator assembly.

The invention further comprehends an inflator assembly including an inflator base, a diffuser cap and an initiator assembly. The inflator base comprises a substantially planar end wall including an opening passing therethrough. A base side wall generally perpendicularly extends from the end wall. An attachment collar generally perpendicularly extends from the base side wall at a side opposite the end wall. The diffuser cap includes a top wall and a cap side wall generally perpendicularly extending from the top wall. The cap side wall is attached to the base side wall of the inflator base. The initiator assembly comprises a stamped adapter disposed through the end wall opening of the inflator base and resistance welded joined to the inflator base.

The invention still further comprehends an inflator assembly including an inflator base. The inflator base comprises a substantially planar end wall having, a first opening and a second opening in the end wall. A base side wall generally perpendicularly extends from the end wall. An attachment collar generally perpendicularly extends from the base side wall at a side opposite the end wall. A diffuser cap is attached to the inflator base to form a chamber. The diffuser cap includes a top wall and a cap side wall generally perpendicularly extending from the top wall. The cap side wall is attached to the base side wall. A first initiator assembly is disposed through the first opening. The first initiator assembly comprises a first stamped adapter resistance welded joined to the inflator base. A second initiator assembly is disposed through the second opening. The second initiator assembly comprises a second stamped adapter resistance welded joined to the inflator base. A first cup is disposed within the chamber. The first cup includes an open end adapted to fittingly attach around a portion of the first initiator assembly. A second cup is also disposed within the chamber. The second cup includes an open end adapted to fittingly attach around a portion of the second initiator assembly.

As used herein, references to "resistance welded joined" are to be understood to refer to a connection of two or more components by a resistance weld or resistance welding. "Resistance weld" or "resistance welding" are to be understood to refer to a welding process which produces coalescence of metals with the heat obtained from resistance of the material to, for example, electric current and by the application of pressure.

Further, references herein to "simple stamping" are to be understood to refer to a stamped configuration including one or more openings in a planar or substantially planar wall.

Other objects and advantages will be apparent to those skilled in the art from the following detailed description taken in conjunction with the appended claims and drawings.

DETAILED DESCRIPTION OF THE INVENTION

The present invention provides an inflator assembly including an inflator base portion incorporating a simple stamping. As described in greater detail below, a stamped adapter of an initiator assembly is resistance welded joined to the inflator base simple stamping.

Figure 1:
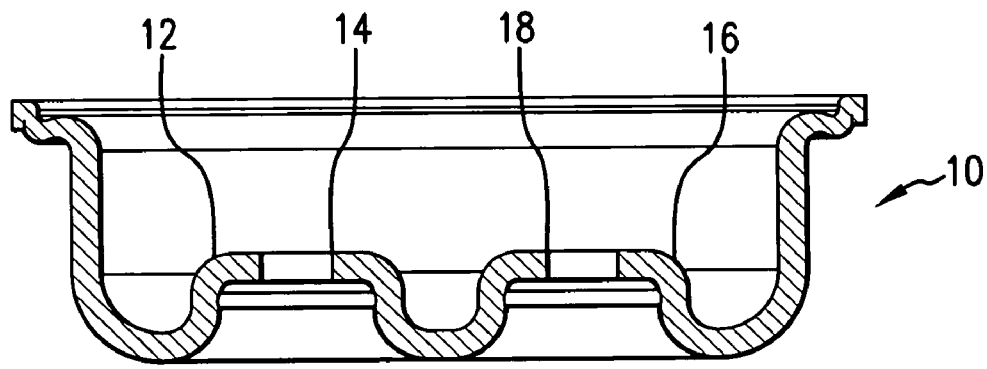
FIG. 1 is a sectional view of a configuration of a stamped lower shell component that is known and available in the art for inflator devices.
Figure 2:
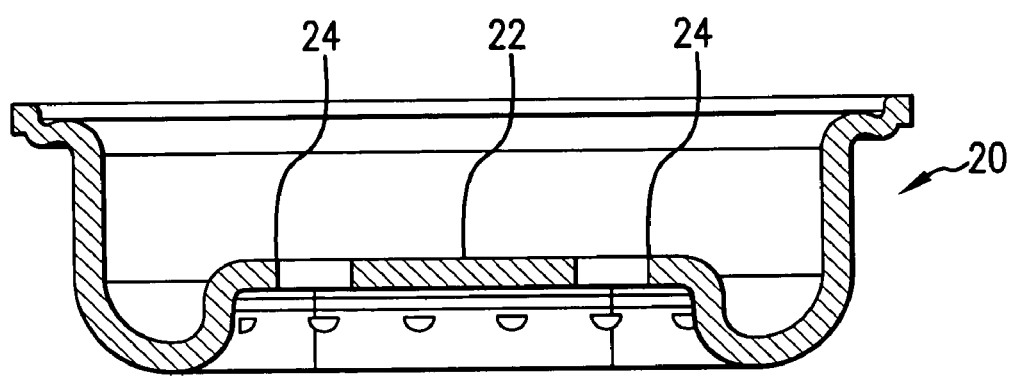
FIG. 2 is a sectional view of another configuration of a stamped lower shell component that is known and available in the art for inflator devices.
Figure 3:
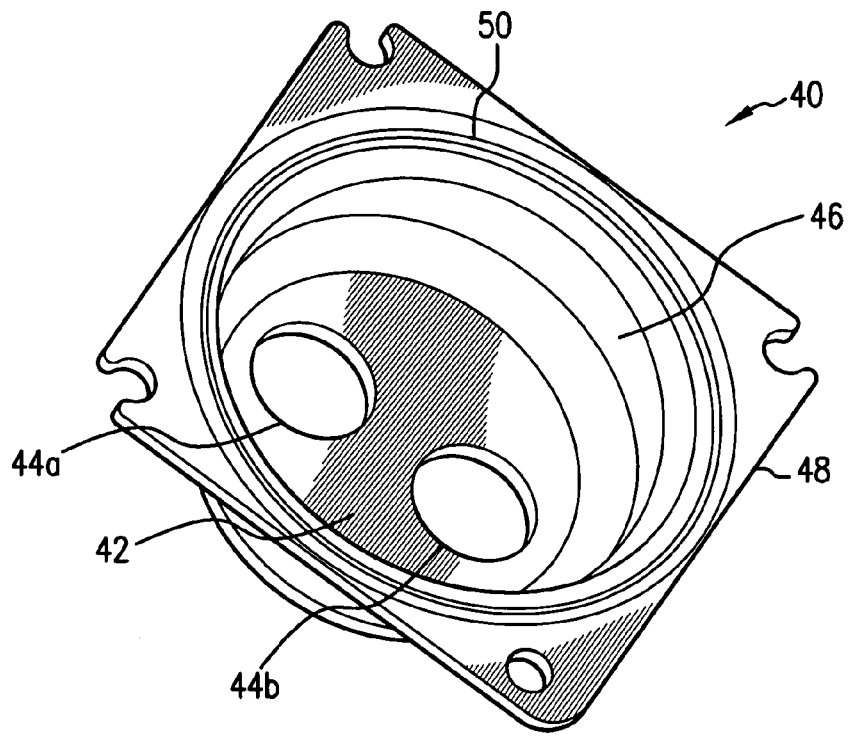
FIG. 3 is a perspective view of an inflator base for an inflator assembly according to one embodiment of the invention.

FIG. 3 is a perspective view of an inflator base 40 for an inflator assembly according to one embodiment of the invention. The inflator base 40 incorporates a simple stamping including an end wall 42 wherethrough two openings 44a and 44b are disposed. The inflator base 40 includes a simple stamping in that the end wall 42 is substantially planar and includes no inverted material, i.e., inverted hubs, such as, for example, shown in FIGS. 1 and 2, and discussed above. The two openings 44a and 44b are each adapted to receive an initiator assembly, such as is described below. As will be appreciated by one skilled in the art following the teachings herein provided, various and alternative configurations are available for the simple stamping, such as, for example, in another embodiment of the invention where the inflator base includes a single opening where the inflator device desirably includes only a single initiator.

The inflator base 40 also includes a base side wall 46 generally perpendicularly extending from the end wall 42. The inflator base 40 further includes an attachment collar 48 generally perpendicularly extending from the base side wall 46 at a side 50 opposite the end wall 42. The attachment collar 48 serves to form an interface attachment such as can be used to attach the inflator assembly to a vehicle.

Figure 4:
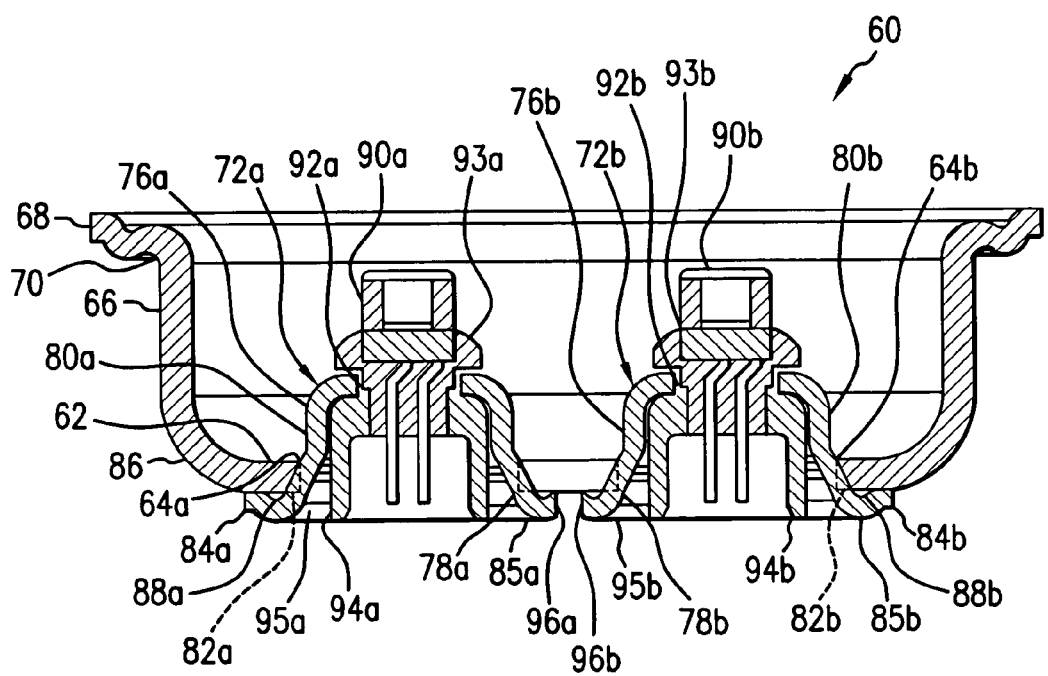
FIG. 4 is a sectional view of an inflator base for an inflator assembly according to another embodiment of the invention.

FIG. 4 is a sectional view of an inflator base 60 for an inflator assembly according to another embodiment of the invention. The inflator base 60 includes a simple stamping. The simple stamping includes a substantially planar end wall 62 wherethrough a first opening 64a and a second opening 64b are disposed. The inflator base 60 includes a base side wall 66 generally perpendicularly extending from the end wall 62. The inflator base 62 also includes an attachment collar 68 generally perpendicularly extending from the base side wall 66 at a side 70 opposite the end wall 62.

A first initiator assembly 72a is disposed through the first opening 64a and a second initiator assembly 72b is disposed through the second opening 64b. The first initiator assembly 72a includes a stamped adapter 76a. The stamped adapter 76a is resistance welded joined with the inflator base 60 simple stamping. The stamped adapter 76a includes a section 78a where an outer surface 80a of the stamped adapter 76a includes an outwardly increasing diameter. The outer surface 80a in an area of section 78a is wider than a diameter of the first opening 64a, thereby providing a portion whereby the stamped adapter 76a is resistance welded joined with the inflator base at the first opening 64a.

In one embodiment of the invention, a material thickness of the stamped adapter is desirably about 0.4 to about 1.6 times the material thickness of the inflator base to which the stamped adapter is resistance welded joined. As will be appreciated by one skilled in the art following the teachings herein provided, the stamped adapters of the invention can be made of various and alternative configurations and materials, particularly metals, such as, for example, aluminum or steel. The stamped adapters of the invention are relatively simple and inexpensive to form or manufacture, compared to, for example, a machined adapter. Incorporating one or more stamped adapter(s) by resistance welding, such as, for example, the stamped adapter shown in FIG. 4, is a cost-effective substitute for welding, soldering or brazing a machined adapter to an inflator device.

In one embodiment of the invention, the stamped adapter 76*a* is resistance welded joined with the inflator base simple stamping by passing an electric current through at least one of the inflator base 60 and the stamped adapter 76*a* and pressing the stamped adapter 76*a* and the inflator base 60 simple stamping together. While pressing the stamped adapter 76*a* into the simple stamping of the inflator base 60, the stamped adapter section 78*a* of outwardly increasing diameter is pressed into the inflator base end wall 62 at an original edge 82*a* (shown in phantom) around the first opening 64*a*. The portion of the end wall edge 82*a* shown in phantom is resistance welded joined to the stamped adapter section 78*a*. Upon resistance welding, the portion of the end wall original edge 82*a* shown in phantom forms a monolithic bond with the stamped adapter section 78*a*. Resistance welding is a relatively quick and efficient welding process for joining the stamped adapter 76*a* and the inflator base simple stamping, typically requiring only a few seconds at most to perform the necessary resistance weld.

The stamped adapter 76*a* includes an outwardly extending flange 84*a*. In one embodiment of the invention, as shown in FIG. 4, the outwardly extending flange 84*a* is disposed at an end 85a of the stamped adapter 76*a*. The stamped adapter 76*a* extends through the first opening 64*a* to dispose a portion of the flange 84*a* adjacent to an outer surface 86 of the end wall 62. As will be appreciated by one skilled in the art following the teachings herein provided, in one embodiment of the invention the outwardly extending flange desirably functions as a stop to allow proper and consistent positioning of the stamped adapter 76*a* through the first opening 64*a*. The flange 84*a* also desirably reinforces the inflator base end wall 62, thereby desirably increasing the internal pressure at which the inflator base will rupture or leak. In one embodiment of the invention, the combination of the stamped adapter resistance welded joined to the inflator base end wall provides an inflator base that can withstand internal pressures within a sealed inflator device chamber of greater than about 5,000 pounds per square inch, desirably greater than about 6,000 pounds per square inch, and more preferably up to at least about 7,500 pounds per square inch. In one embodiment of the invention a portion of the flange 84*a* in contact with the end wall outer surface 86 forms a monolithic bond with the end wall outer surface 86 during or upon resistance welding the stamped adapter 76*a* and the inflator base 60, thereby providing additional strength to reinforce the inflator base end wall 62.

In one embodiment of the invention, as shown in FIG. 4, the flange 84*a* is curved to form a cavity 88*a* disposed between the flange 84*a* and the end wall outer surface 86. The cavity 88*a* provides an area for collection of any dispersed material resulting from the resistance weld between the inflator base end wall edge 82 and the stamped adapter 76*a*.

The first initiator assembly 72*a* includes an initiator 90*a*, also commonly known or referred to in the art as a squib, joined to the stamped adapter 76*a*. As will be appreciated by one skilled in the art following the teachings herein provided, various and alternative initiators are known and available in the art for use in the initiator assembly of the invention. In the embodiment of the invention shown in FIG. 4, the initiator 90*a* can be joined to the stamped adapter 76*a* by means known and available to one skilled in the art, such as, for example, welding. The initiator device 90*a* is joined to the stamped adapter 76*a* by joining or forming, such as, for example, by injection molding, ultrasonic welding or snap-fitting, an initiator adapter or holder 93*a* and a mating interface 94*a*, adapted to receive an electrical connector (not shown), through an opening 92*a* in the stamped adapter 76*a*. As will be appreciated by one skilled in the art following the teachings herein provided, various and alternative sizes, shapes and configurations are available for the mating interface, as may be needed or desired to receive various and alternative electrical connector designs. In one embodiment of the invention, the mating interface can include notches and/or grooves, as are known in the art, for providing proper alignment of an electrical connector and/or securing the electrical connector.

In one embodiment of the invention, as shown in FIG. 4, the mating interface 94*a* is disposed within an adapter cavity 95*a* formed by the stamped adapter 76*a*. The mating interface 94*a* desirably does not extend from the adapter cavity 95*a* substantially beyond or past the end 85*a* of the stamped adapter 76*a*. In the embodiment of the invention shown in FIG. 4, the mating interface is substantially flush with the end 85*a* of the stamped adapter 76*a*. As will be appreciated by one skilled in the art following the teachings herein provided, surrounding a portion of the mating interface, particularly a thermoplastic mating interface, with the stamped adapter provides desirable protection for the mating interface, thereby reducing or eliminating damage to the mating interface during manufacture, assembly and/or installation of the inflator assembly.

As discussed above, the inflator base 60 also includes a second initiator assembly 72*b* is disposed through the second opening 64*b*. The second initiator assembly 72*b* includes substantially identical components to those described above for the first initiator assembly 72*a*. For brevity, the components of the second initiator assembly 72*b* are identified in FIG. 4 with the same reference number as the components of the first initiator assembly 72*a*, only identified by the letter "b" and without further textual description.

Figure 5:
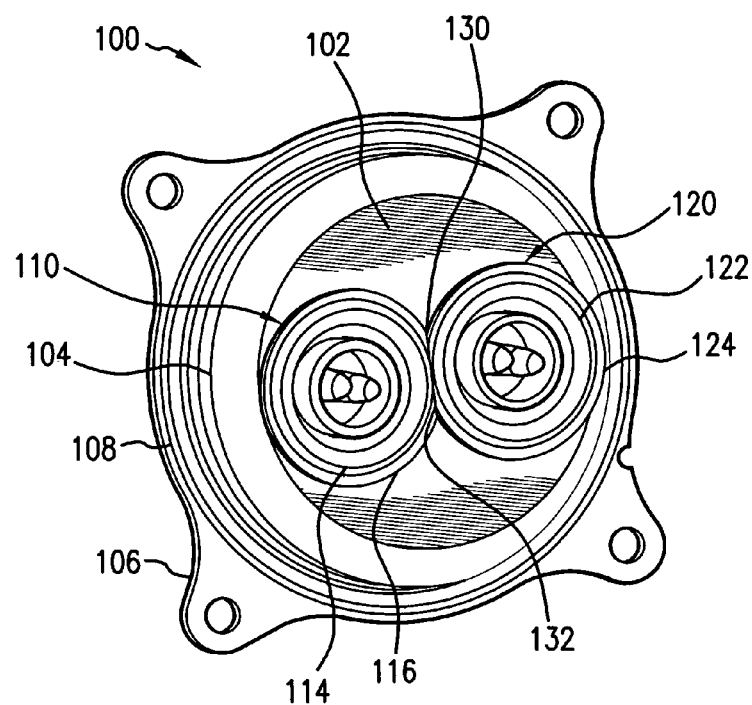
FIG. 5 is a perspective view of an inflator base according to yet another embodiment of the invention.

In one embodiment of the invention, where two initiator assemblies are resistance welded joined to an inflator base, a generally round flange of the stamped adapter of each initiator assembly includes a flat portion to allow the stamped adapters to be positioned closer to each other in the inflator base end wall. Referring to FIG. 4, the stamped adapter 76*a* includes a flattened portion 96*a* that is disposed facing toward a corresponding flattened portion 96*b* of the stamped adapter 76*b*. FIG. 5 further illustrates this aspect of the invention.

FIG. 5 is a perspective view of an inflator base 100 according to another embodiment of the invention. The inflator base 100 incorporates a simple stamping including an end wall 102 wherethrough two openings (not shown) are disposed. The inflator base 100 includes a simple stamping in that the end wall 102 is substantially planar and includes no inverted material or inverted hubs. The inflator base 100 also includes a base side wall 104 generally perpendicularly extending from the end wall 102. The inflator base 100 includes an attachment collar 106 generally perpendicularly extending from the base side wall 104 at a side 108 opposite the end wall 102. The attachment collar 106 serves to form an interface attachment which is used to attach the inflator assembly to a vehicle.

Two initiator assemblies are resistance welded joined to the inflator base simple stamping. A first initiator assembly 110 includes a stamped adapter 114 including an outwardly extending flange 116. The stamped adapter extends through one of the openings in the end wall 102 to dispose the flange 116 adjacent the end wall 102. A second initiator assembly 120 includes a stamped adapter 122 including an outwardly extending flange 124. The stamped adapter extends through one of the openings in the end wall 102 to dispose the flange 124 adjacent the end wall 102. The generally round first initiator assembly flange 116 includes a flattened portion 130. The generally round second initiator assembly flange 124 includes a similar flattened portion 132. As shown in FIG. 5, the first and second initiator assemblies 110 and 120 are resistance welded joined to the inflator base 100 such that the flattened portions 130 and 132 are disposed toward each other. By aligning the flattened portions 130 and 132, the first and second initiator assemblies 110 and 120 are able to be positioned side-by-side at a desirably closer predetermined distance. As will be appreciated by one skilled in the art following the teachings herein provided, including flattened portions in the flanges of two adjacent initiator assemblies can desirably allow for generally larger flange sizes, when the larger flange sizes would otherwise require a larger than desired spacing between two adjacent initiator assemblies.

Figure 6:
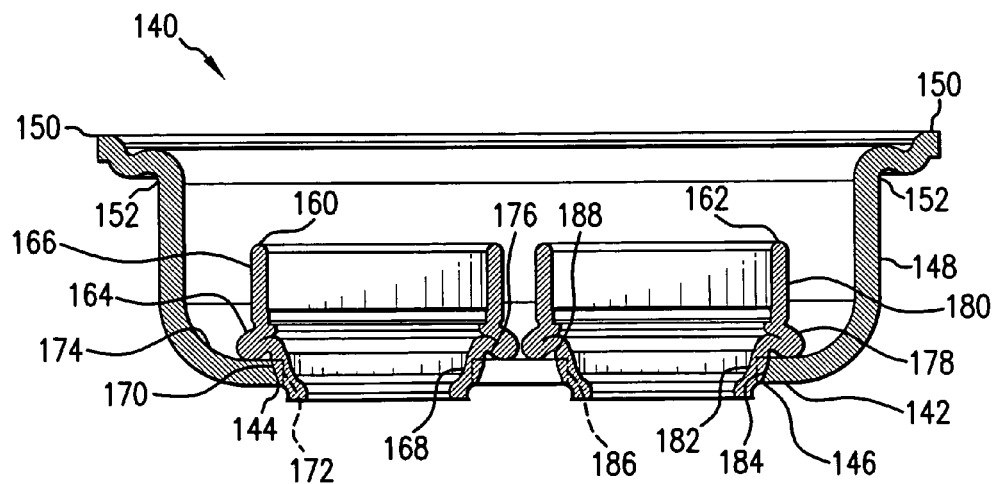
FIG. 6 is a sectional view of an inflator base for an inflator assembly according to yet still another embodiment of the invention.

FIG. 6 is a sectional view of an inflator base 140 of an inflator assembly according to another embodiment of the invention. The inflator base 140 incorporates a simple stamping including an end wall 142 wherethrough two openings 144 and 146 are disposed. The inflator base 140 includes a simple stamping in that the end wall 142 is substantially planar and includes no inverted material or inverted hubs. The inflator base 140 includes a base side wall 148 generally perpendicularly extending from the end wall 142. The inflator base 140 further includes an attachment collar 150 generally perpendicularly extending from the base side wall 148 at a side 152 opposite the end wall 142.

The two openings 144 and 146 are each adapted to receive an initiator assembly. In FIG. 6, a first stamped adapter 160 is disposed through the first opening 144 and a second stamped adaptor 162 is disposed through the second opening 146. For simplicity of illustration, in FIG. 6, additional components of the initiator assemblies of the invention, such as described above, other than the stamped adapters 160 and 162 are not shown.

The first stamped adapter 160 includes an outwardly extending flange 164 outwardly extending from and disposed about an outer surface 166 of the stamped adapter 160. The flange 164 is formed at about a midpoint of the first stamped adapter 160 adjacent to a section 168 of decreasing diameter. The first stamped adapter 160 is resistance welded joined to the inflator base simple stamping at an edge 170 surrounding the first opening 144. The first stamped adapter 160 is resistance welded joined with the inflator base simple stamping bypassing an electric current through at least one of the inflator base 140 and the stamped adapter 160 and pressing the first stamped adapter 160 and the inflator base simple stamping together. In the embodiment of the invention shown in FIG. 6, the stamped adapter is pressed into the first opening 144 from inside the inflator base 140 to form a monolithic weld between an original edge 172 shown in phantom and surrounding the first opening 144 and the stamped adapter section 168 of decreasing diameter. A portion of the flange 164 is disposed adjacent to an inner surface 174 of the end wall 142. As shown in FIG. 6, the flange 164 is angled to form a cavity 176 between the flange 164 and the end wall inner surface 174. As will be appreciated by one skilled in the art following the teachings herein provided, the cavity 176 is adapted to receive any dispersement of material resulting from the resistance weld between the first stamped adapter 160 and the original edge 172.

Similarly to the first stamped adapter 160, the second stamped adapter 162 includes an outwardly extending flange 178 outwardly extending from and disposed about an outer surface 180 of the second stamped adapter 162. The flange 178 is formed at about a midpoint of the second stamped adapter 162 adjacent to a section 182 of decreasing diameter. The second stamped adapter 162 is resistance welded joined to the inflator base simple stamping at an original edge 184 surrounding the second opening 146. The second stamped adapter 162 is resistance welded joined with the inflator base simple stamping by passing an electric current through at least one of the inflator base 140 and the second stamped adapter 162 and pressing the second stamped adapter 162 and the inflator base simple stamping together. As described above for the first stamped adapter 160, the second stamped adapter 162 is pressed into the second opening 146 from inside the inflator base 140 to form a monolithic weld between an original edge 186 shown in phantom and surrounding the second opening 146 and the stamped adapter section 182 of decreasing diameter. A portion of the flange 178 is disposed adjacent to an inner surface 174 of the end wall 142 and also forms a cavity 188 between the flange 178 and the end wall inner surface 174.

Figure 7:
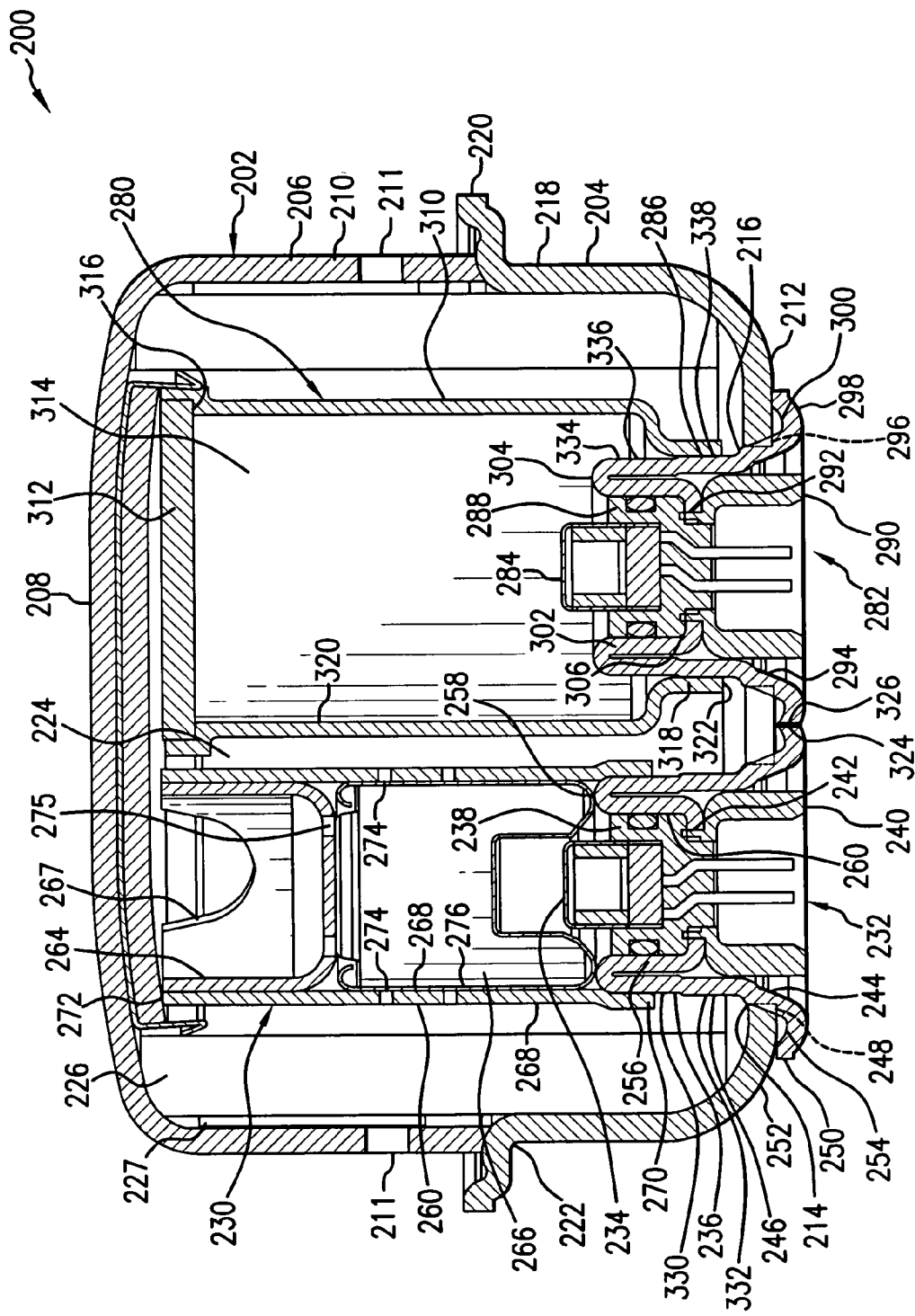
FIG. 7 is a sectional view of an adaptive output passenger side inflator assembly in accordance with one embodiment of the invention.

FIG. 7 illustrates a sectional view of an adaptive output passenger side inflator assembly in accordance with a one embodiment of the invention and generally designated with the reference numeral 200. While the invention will be described hereinafter with particular reference to a passenger side airbag inflatable restraint system installation, it will be understood that the invention has general applicability to other types or kinds of airbag assemblies including, for example, driver side, and side impact airbag assemblies such as for automotive vehicles including vans, pick-up trucks, and particularly automobiles.

The inflator assembly 200 has a generally cylindrical external outline and includes a housing construction 202 such as formed of two structural components, i.e., a lower shell or inflator base 204 and an upper shell or diffuser cap 206, such as may desirably be made of aluminum or steel and appropriately joined or fastened together such as by application of an appropriate welding operation. The housing 202 is illustrated in the general form of a circular cylinder. As will be appreciated by one skilled in the art following the teachings herein provided, various and alternative shapes, sizes, configurations and materials are available for forming or manufacturing the inflator assembly 200, the housing 202 and/or for components of the inflator assembly 200 described below.

The diffuser cap 206 is in the general form of an inverted bowl and includes a top wall 208 and a cylindrical cap side wall 210. The cap side wall 210 includes a plurality of spaced, preferably, generally uniformly spaced gas exit ports 211.

The inflator base 204 includes a simple stamping; the simple stamping being formed by a substantially planar end wall 212 including a first opening 214 and a second opening 216. A base side wall 218 generally perpendicularly extends from the end wall 212 and attaches to the cap side wall 210. An attachment collar 220 generally perpendicularly extends from the base side wall 218, at a side 222 of the base side wall 218 opposite the end wall 212, to form an interface attachment which is used to attach the inflator assembly 200 to a vehicle the occupants of which are to be protected from injury tending to result from the impact of a collision.

The housing 202 is configured to define a central, generally cylindrical chamber 224. In one embodiment of this invention, the chamber 224 desirably contains or houses a supply of a first gas generant material (not shown), typically in the form of a pyrotechnic, such as is known and available for use in airbag inflators, such as composed of a transition metal amine nitrate with oxidizer and binder, for example. Surrounding the gas generant material along the side of the chamber 224 is a filter assembly 226 such as includes a combustion screen or filter such as is known and available to one skilled in the art. Surrounding the filter assembly 226 and generally adjacent the inner surface of the chamber 224 is an adhesive-backed foil seal 227 which preferably hermetically seals the gas generant material within the inflator assembly 200, thereby protecting the gas generant material from various possibly harmful ambient conditions, such as including moisture.

A first igniter assembly, generally designated by the reference numeral 230, is mounted to the housing 202 in a location within the chamber 224 via the first mounting opening 214. The first igniter assembly 230 includes a first initiator assembly 232 disposed through the first opening 214. The first initiator assembly 232 includes a known pyrotechnic initiator device or squib 234 joined to a stamped adapter 236. The initiator device 234 is joined to the stamped adapter 236 by joining or forming, such as, for example, by injection molding, ultrasonic welding or snap-fitting, an initiator adapter or holder 238 and a mating interface 240, for receiving an electrical connector (not shown), through an opening 242 in the stamped adapter 236.

The stamped adapter 236 is disposed through the first opening 214 and resistance welded joined with the inflator base simple stamping. The stamped adapter 236 includes a section 244 of outwardly increasing width. The width of at least a portion of the section 244 is wider than a diameter of the first opening 214, thereby allowing the stamped adapter 236 to be resistance welded joined with the inflator base 204 at the first opening 214.

In one embodiment of the invention, the stamped adapter 236 is resistance welded joined with the inflator base simple stamping by passing an electric current through at least one of the inflator base 204 and the stamped adapter 236 and pressing the stamped adapter 236 and the inflator base 204 simple stamping together. While pressing the stamped adapter 236 into the simple stamping of the inflator base 204, the stamped adapter section 244 of outwardly increasing width is pressed into the inflator base 204 at an original edge 248 (shown in phantom) around the first opening 214 before resistance welding. Upon resistance welding, the original edge 248 shown in phantom forms a monolithic bond with the stamped adapter section 244.

The stamped adapter 236 includes an outwardly extending flange 250. The first initiator assembly 232 extends through the first opening 214 to dispose a portion of the flange 250 adjacent to an outer surface 252 of the end wall 206. The flange 250 is desirably curved to form a cavity 254 disposed between the flange 250 and the end wall outer surface 252. As discussed above, the outwardly extending flange 250 desirably functions as a stop to provide proper and consistent positioning of the stamped adapter 236 through the first opening 214 and to desirably reinforce the inflator base end wall 212. As also discussed above, the cavity 254 provides an area for collection of dispersed material produced during the resistance welding of the inflator base end wall edge 248 and the stamped adapter 236.

The stamped adapter 236 includes a redrawn portion 256 that is inverted, bent inward or otherwise pushed inside at bend 258. The stamped adapter 236 thus forms a cup portion 260 adapted to receive and contain at least a portion of the initiator device 234 and the initiator adapter 238. The configuration of the stamped adapter 236 provides an extended outer surface 246 to which an igniter cup 260, described below, can be attached while disposing the opening 242 at a position to allow incorporation of a standard initiator device 234 having standard length initiator pins 262. In addition, the redrawn portion 256 desirably increases the strength of the stamped adapter 236, thereby providing a more robust and secure hold for the initiator device 234.

The inflator assembly 220 incorporates a first cup, embodied in FIG. 7 as the igniter cup 260, generally sized for the amount of igniter material (not shown) to be therein contained. The inflator assembly 200 makes use of an elongated igniter cup 260 and an associated igniter cup insert or plug element 264 to form an igniter material volume 266 of a size selected to meet the needs and requirements for a particular inflatable restraint application. As will be appreciated, igniter cup inserts or plugs of various designs or configurations can be used in the broader practice of the invention. In accordance with the illustrated preferred embodiment of the invention, the igniter cup insert 264 is in the form of a cup such as made of ASTM A1011 HSLAS-F steel, for example, and such as press fitted within the igniter cup 260 to form the igniter material volume 266. The igniter cup insert 264 includes a U-shaped cutout 267 through which gas generant material (not shown) can be inserted within the igniter cup insert 264, thereby utilizing more space within the chamber 224 for gas generant material.

As shown, the igniter cup 260 is a generally hollow, open-ended cylinder composed of a sidewall 268 having a generally circular cross section. The igniter cup 260 includes generally opposed first and second open ends 270 and 272, respectively. The igniter cup sidewall 268 includes a plurality of spaced apart and specifically sized gas exit orifices 274. Similarly, the igniter cup insert 264 may, if desired, also include a plurality of spaced apart and specifically sized gas exit orifices 275. In particular, the gas exit orifices 274 and, if included, the gas exit orifices 275 are desirably appropriately sized, shaped, positioned and arranged to focus the ignition products resulting from reaction of the igniter material into the bed of gas generant material contained within the chamber 224.

As shown, the igniter cup first open end 270 is adapted to accept the first initiator assembly 232 and fittingly attach around a portion of the first initiator assembly 232, desirably via a press fit of such igniter cup end 270 around the stamped adapter 236. Such a press fit attachment serves to focus, force or direct the ignition products through the gas exit orifices 274 and, if included, the gas exit orifices 275, and such as may serve to appropriately focus the ignition products resulting from reaction of the igniter material into the bed of gas generant material contained within the chamber 224. The supply of the igniter material normally (e.g., when the inflator is in a static or prior to actuation state) can be contained within the igniter cup 260 in a closed canister, cartridge or container 276.

As will be appreciated, with the inflator assembly design shown in FIG. 7, the placement of different quantities of igniter material within the igniter cup 260 can easily be accomplished such as by changing the size of the igniter material volume 266 such as by simply changing either or both the size and placement of the igniter cup insert 264.

In addition to facilitating the tailoring of the design of particular inflator assemblies to meet the requirements of specific applications by facilitating the inclusion of a specifically selected amount of igniter material therewithin, the inclusion and use of an igniter cup insert 264 in accordance with the invention also can desirably help ensure that the supply of igniter material and the initiator device 234 remain in proper and desired relative position to result in desired reaction of the igniter material upon actuation of the initiator device 234.

The ignition of the igniter material upon actuation customarily results in an increase in pressure within the canister 276 with the subsequent predetermined rupturing or opening of the canister 276 to permit passage of ignition products produced by the actuation of the igniter material through the exit orifices 274 and 275 and from the first igniter assembly 230 to the gas generant material contained within the chamber 224. The resulting contact by or between the ignition products and the gas generant material results in the ignition and reaction of the gas generant material, with gases so produced passing through the filter assembly 226, rupturing the foil seal 227 and passing through the gas exit ports 211 and out from the inflator assembly 200 into an associated airbag cushion (not shown).

The housing 202 also includes a second igniter assembly, generally designated by the reference numeral 280, which is mounted to the housing 202 in a location within the chamber 224 via the second mounting opening 216. The second igniter assembly 280 includes a second initiator assembly 282. In one embodiment of the invention, as shown in FIG. 7, the second initiator assembly 282 is identical or at least substantially identical to the first initiator assembly 232. The second initiator assembly 282 is disposed through the second opening 216. The second initiator assembly 282 includes a known pyrotechnic initiator device or squib 284 joined to a stamped adapter 286. The initiator device 284 is joined to the stamped adapter 286 by joining or forming, such as, for example, by injection molding, ultrasonic welding or snap-fitting, an initiator adapter or holder 288 and a mating interface 290, for receiving an electrical connector (not shown), through an opening 292 in the stamped adapter 236.

The stamped adapter 286 is disposed through the second opening 216 and resistance welded joined with the inflator base simple stamping. The stamped adapter 286 includes a section 294 of outwardly increasing width, wherein at least a portion is wider than a diameter of the second opening 216, thereby allowing the stamped adapter section 294 to be resistance welded joined with an original edge 296 (shown in phantom) surrounding the second opening 216 before resistance welding. Upon resistance welding the stamped adapter 286 to the inflator base simple stamping, material forming the original edge 296, represented in phantom, forms a monolithic bond with material of the stamped adapter section 294.

The stamped adapter 286 includes an outwardly extending flange 298. The second initiator assembly 282 extends through the second opening 216 to dispose a portion of the flange 298 adjacent to the outer surface 252 of the end wall 206. The flange 298 is desirably curved to form a cavity 300 disposed between the flange 298 and the end wall outer surface 252. The stamped adapter 286 also includes a redrawn portion 302 that is inverted, bent inward or otherwise pushed inside at a bend 304 to form a cup portion 306 adapted to receive and contain at least a portion of the initiator device 284 and the initiator adapter 288.

The second igniter assembly 280 includes a second cup, embodied in FIG. 7 as a generant cup 310, and a lid closure 312 which cooperate to form a generant cup chamber 314 wherein is desirably placed a selected quantity of a second gas generant material (not shown) such as typically in the form of a pyrotechnic. The second gas generant material may typically be in the form of a pyrotechnic material and may be either the same or different in composition, shape, size or form, as compared to the first gas generant material.

The generant cup 310 preferably includes a shoulder portion 316 such as formed therein. The lid closure 312 and the shoulder portion 316 desirably form a press or interference fit form of attachment when in a static state or condition. The generant cup 310 also includes a base portion 318 such as integrally formed in one piece with a generally cylindrical sidewall 320. The base portion 318 includes an open end 322 adapted to accept the stamped adapter 286 and fittingly attach around a portion of the second initiator assembly 282, desirably via a press fit of such open end 322 around the stamped adapter 286.

In one embodiment of the invention, as shown in FIG. 7, the outer surfaces of the stamped adapters 236 and 286 include a stepped, sloped or otherwise graduated diameter. The differences in diameter along the outer surfaces of the stamped adapters 236 and 286, desirably correspond to a difference, desirably a slight difference, in diameter between the igniter cup open end 270 and the generant cup open end 322. As shown in the embodiment of FIG. 7, the outer surface 246 of the stamped adapter 236 includes a first diameter portion 330 having a different diameter from a second diameter portion 332. Similarly, an outer surface 334 of the stamped adapter 286 includes a first diameter portion 336 having a different diameter from a second diameter portion 338. In FIG. 7, the first diameter portions 330 and 334 have a smaller diameter than the second diameter portions 332 and 338. The igniter cup first open end 270 has a diameter that allows the first open end 270 to fittingly attach to or around one of the first diameter portions 330 and 336. In FIG. 7, the igniter cup first open end 270 is fittingly attached to or around the first diameter portion 330 of the first stamped adapter 236. The generant cup open end 322 has a diameter that allows the open end 322 to fittingly attach to or around the one of the second diameter portions 332 and 338. In FIG. 7, the generant cup open end 322 is fittingly attached to or around the second diameter portion 338 of the second stamped adapter 286. As will be appreciated by one skilled in the art following the teachings herein provided, the differences in diameter of the stamped adapter and the open ends of the igniter cup and the generant cup desirably allows or helps ensure proper positioning and connection of the fitting attachment of the igniter cup and the generant cup, respectively, to the stamped adapter. In one embodiment of the invention, the press fit attachment of the first and second cups to the respective initiator assembly is sufficiently tight to secure the first and second cups during activation of the igniter material and/or gas generant material without any welding, although the broader practice of the invention is not intended to be so limited.

The generant cup 310 and the lid closure 312 desirably cooperate and function in a manner such as to prevent the undesired entry into the generant cup chamber 314 of the combustion products resulting upon actuation of the first initiator device 234. Further, the generant cup 310 and the lid closure 312 desirably cooperate and function to permit the combustion products formed by reaction of the gas generant material contained within the generant cup chamber 314, when properly and desirably actuated, to pass from the generant cup chamber 314 out into the chamber 224 and subsequently through the filter assembly 226 and the exit ports 211 out from the inflator assembly 200 and into an associated airbag cushion (not shown).

As discussed previously, in one embodiment of the invention, such as shown in FIG. 7, where two initiator assemblies are resistance welded joined to an inflator base, the generally round flange of the stamped adapter of each initiator assembly can include a flat portion to allow the stamped adapters to be disposed closer to each other. As shown in FIG. 7, the flange 250 of the stamped adapter 236 includes a flattened portion 324 that is disposed facing toward a corresponding flattened portion 326 of the flange 298 of the stamped adapter 386.

The inflator assembly 200 can be appropriately operated in accordance with selected operating conditions as may be required or desired for particular inflatable restraint system installations and applications. It will be appreciated that an inflator assembly in accordance with the invention can provide operation performance in accordance with selected operating conditions as may be required or desired for particular inflatable restraint system installations and applications. More specifically, an inflator assembly of the invention can be actuated in a manner such that either or both the quantity or rate of inflation gas production can be appropriately varied, such as at the time of a vehicle crash or collision incident, to take into account one or more conditions of occupant presence, as described above. Such inflator performance adaptability results from the subject inflator having two discrete and ballistically isolated chambers of gas generant materials. Thus, such inflator assemblies are particularly suited for application as adaptive output inflators such as can be made generally dependent on one or more selected operating conditions such as ambient temperature, occupant presence, seat belt usage and rate of deceleration of the motor vehicle, for example.

It is to be appreciated that while an inflator assembly in accordance with the invention may utilize a gas generant material of the same composition and physical form or parameters as both the first and second gas generant materials, the broader practice of the invention is not so limited. For example, it specifically may be desired that the first gas generant material be relatively slow burning so as to result in or provide a slower or gentler onset of inflation of the associated airbag cushion and that the second gas generant material be relatively quick burning to provide a quicker or faster inflation rate for the associated airbag and such as may be desired in the occurrence of the associated vehicle being involved in a relatively severe collision or crash. Such difference in performance can be realized through the use of gas generant materials of different composition as the first and second gas generant materials. Alternatively or additionally, the first and second gas generant materials can be in different physical form or have different physical parameters, e.g., shape and size. For example, to provide a faster or more rapid burning material it may be desirable to employ a form of the material having an increased or greater surface area.

Thus, the invention provides an improved inflator device including an inflator base with a simple stamping and at least one stamped adapter resistance welded thereto. The simple stamping of the inflator base avoids problems associated with thinning of materials due to relatively more complex stamping configurations. In addition, the stamped adapters of the invention are relatively simple and inexpensive to form or manufacture. Resistance welding the stamped adapters to the simple stamping of the inflator base is a quick, efficient and cost effective substitute for traditional welding methods known for attaching machined adapters to inflator devices, such as, for example, arc welding, soldering or brazing. Furthermore, the stamped adapter, particularly the flange of the stamped adapter, reinforces the inflator base end wall against the pressures within the inflator device during activation and inflation gas production, thereby reducing or eliminating bowing or bending of the inflator base during activation and gas production as well as reducing or eliminating undesirable leaks or rupture of the inflator device, such as can be caused by bowing or bending of the inflator base during activation and gas production.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

What is claimed is:

1. In an inflator assembly, the inflator assembly including an inflator base with at least one opening passing therethrough and wherethrough an initiator assembly is disposed, the improvement comprising:
   the inflator base comprising a simple stamping;
   the initiator assembly comprising a stamped adapter, the stamped adapter comprising an outwardly extending flange and the stamped adapter extends through one of the at least one opening to dispose at least a portion of the flange adjacent the end wall; and
   wherein the stamped adapter is resistance welded joined with the inflator base simple stamping.

2. The inflator assembly of claim 1 wherein the inflator base simple stamping comprises an end wall wheretbrough the at least one opening is disposed, the inflator base additionally comprising a base side wall generally perpendicularly extending from the end wall and an attachment collar generally perpendicularly extending from the base side wall at a side opposite the end wall.

3. The inflator assembly of claim 2 wherein the inflator base simple stamping comprises a substantially planar end wall wherethrough the at least one opening is disposed.

4. The inflator assembly of claim 2 additionally comprising a diffuser cap attached to the inflator base, the diffuser cap comprising a top wall and a cap side wall generally perpendicularly extending from the top wall, wherein the cap side wall is attached to the base side wall.

5. The inflator assembly of claim 1 additionally comprising a cavity disposed between the flange and the end wall.

6. The inflator assembly of claim 5 wherein the outwardly extending flange is disposed at an end of the stamped adapter and the at least a portion of the flange is disposed adjacent to an outer surface of the end wall.

7. The inflator assembly of claim 1 wherein the inflator base simple stamping includes a first opening passing therethrough and wherethrough a first initiator assembly is disposed and the inflator base simple stamping also including a second opening passing therethrough and wherethrough a second initiator assembly is disposed.

8. The inflator assembly of claim 7 wherein the first and the second initiator assemblies each comprise a stamped adapter and wherein the stamped adapter of each of the first and the second initiator assemblies is resistance welded joined with the inflator base simple stamping.

9. The inflator assembly of claim 1 wherein the initiator assembly includes an initiator device joined to the stamped adapter by an injection molded material.

10. An inflator assembly comprising:
   an inflator base comprising a substantially planar end wall including an opening passing therethrough, a base side wall generally perpendicularly extending from the end wall, and an attachment collar generally perpendicularly extending from the base side wall at a side opposite the end wall;
   a diffuser cap comprising a top wall and a cap side wall generally perpendicularly extending from the top wall, wherein the cap side wall is attached to the base side wall; and
   an initiator assembly comprising an initiator, a stamped adapter, and a plastic initiator adapter joining the stamped adapter to the initiator, each of the initiator, the stamped adapter, and the initiator adapter is disposed partially through the end wall opening and the stamped adapter is resistance welded joined to the inflator base, the initiator adapter including a mating interface adapted to receive an electrical connector, and the mating interface is disposed within an adapter cavity formed by the stamped adapter.

11. The inflator assembly of claim 10 wherein the stamped adapter comprises an outwardly extending flange and the stamped adapter extends through one of the at least one opening to dispose at least a portion of the flange adjacent the end wall.

12. The inflator assembly of claim 11 additionally comprising a cavity disposed between the flange and the end wall.

13. The inflator assembly of claim 11 wherein the stamped adapter comprises a redrawn center portion securing an initiator.

14. The inflator assembly of claim 13 additionally comprising a cup including an open end adapted to fittingly attach around a portion of the initiator assembly.

15. The inflator assembly of claim 14 wherein the cup open end is adapted to fittingly attach around a portion of the stamped adapter.

16. The inflator assembly of claim 10 wherein the mating interface does not extend from the adapter cavity beyond an end of the stamped adapter.

17. An inflator assembly comprising:
   an inflator base comprising a substantially planar end wall, a first opening in the end wall, a second opening in the end wall, a base side wall generally perpendicularly extending from the end wall, and an attachment collar generally perpendicularly extending from the base side wall at a side opposite the end wall;
   a diffuser cap attached to the inflator base to form a chamber, the diffuser cap comprising a top wall and a cap side wall generally perpendicularly extending from the top wall, wherein the cap side wall is attached to the base side wall;
   a first initiator assembly disposed through the first opening, the first initiator assembly comprising a first stamped adapter disposed through the first opening and resistance welded joined to the inflator base;
   a second initiator assembly disposed through the second opening, the second initiator assembly comprising a second stamped adapter disposed through the second opening and resistance welded joined to the inflator base;
   a first cup disposed within the chamber, the first cup including an open end adapted to fittingly attach around a portion of the first initiator assembly; and
   a second cup disposed within the chamber, the second cup including an open end adapted to fittingly attach around a portion of the second initiator assembly.

18. The inflator assembly of claim 17 wherein the first stamped adapter comprises a first outwardly extending flange and the first stamped adapter extends through the first opening to dispose at least a portion of the flange adjacent the end wall, and the second stamped adapter comprises a second outwardly extending flange and the second stamped adapter extends through the second opening to dispose at least a portion of the second flange adjacent the end wall.

19. The inflator assembly of claim 18 additionally comprising:
   a first cavity disposed between the first flange and the end wall; and
   a second cavity disposed between the second flange and the end wall.

20. The inflator assembly of claim 18 wherein the first flange comprises a first flattened portion disposed toward a second flattened portion of the second flange.

21. The inflator assembly of claim 18 wherein the chamber is sealed and withstands internal pressure of greater than 6,000 pounds per square inch.

22. The inflator assembly of claim 17 wherein the first stamped adapter comprises a first redrawn center portion securing a first initiator, and the second stamped adapter comprises a second redrawn center portion securing a second initiator.

23. The inflator assembly of claim 17 wherein each of the first and second stamped adapters comprises an outer surface including a first diameter portion and a second diameter portion, a diameter of the first diameter portion is different than a diameter of the second diameter portion, the first cup open end fittingly attaches to the first diameter portion of one of the first and second stamped adapters, and the second cup open end fittingly attaches to the second diameter portion of the other of the first and second stamped adapters.

24. The inflator assembly of claim 17 wherein each of the first initiator assembly and the second initiator assembly includes an initiator device joined to the stamped adapter by an injection molded material.

* * * * *